Dec. 20, 1966  R. T. ROBINETTE  3,292,746
VIBRATION DAMPENER FOR DISK BRAKES
Filed Nov. 5, 1965  3 Sheets-Sheet 1
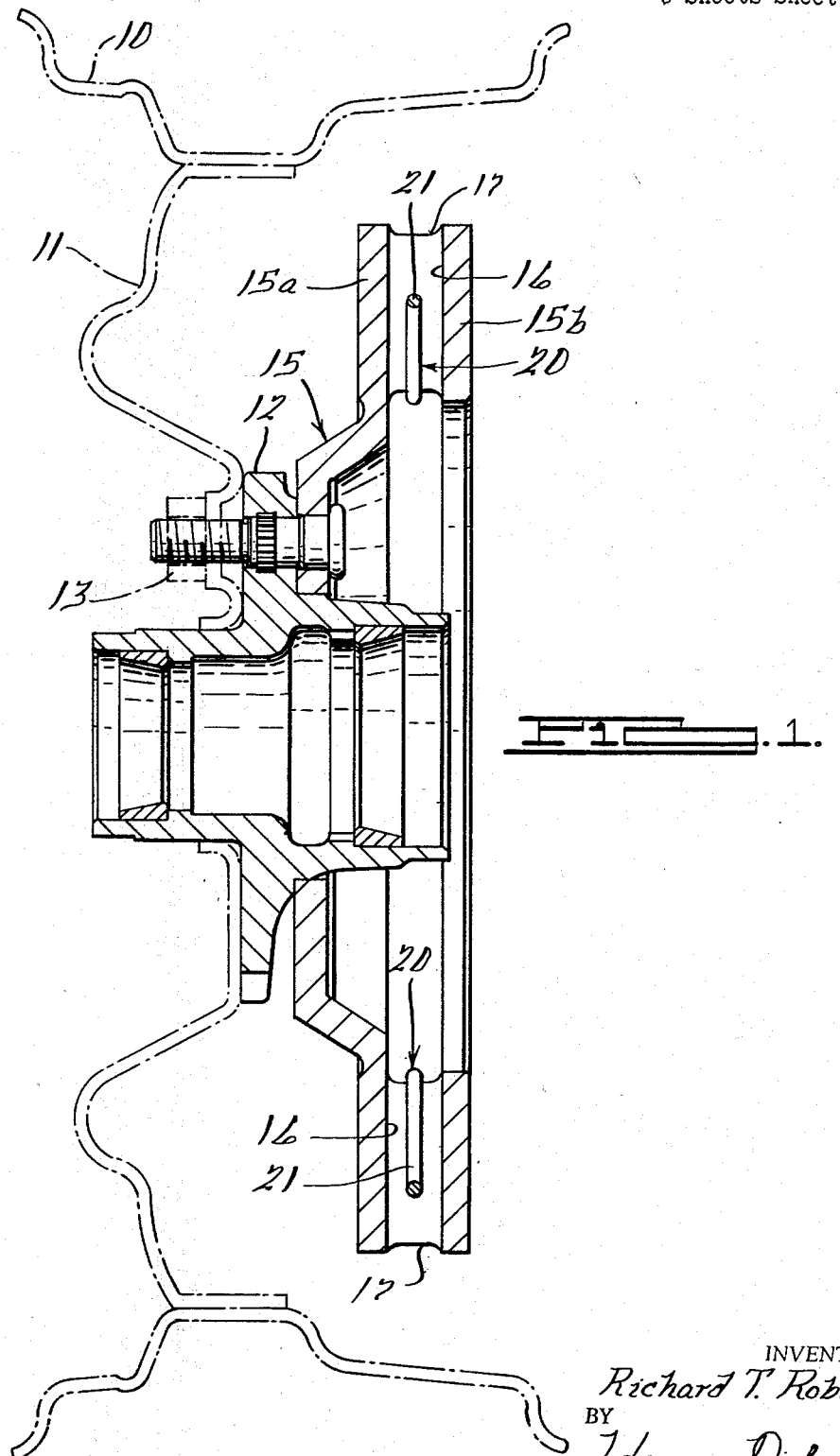
INVENTOR.
Richard T. Robinette
BY
Harness, Dickey & Pierce
ATTORNEYS Dec. 20, 1966   R. T. ROBINETTE   3,292,746
VIBRATION DAMPENER FOR DISK BRAKES
Filed Nov. 5, 1965   3 Sheets-Sheet 2
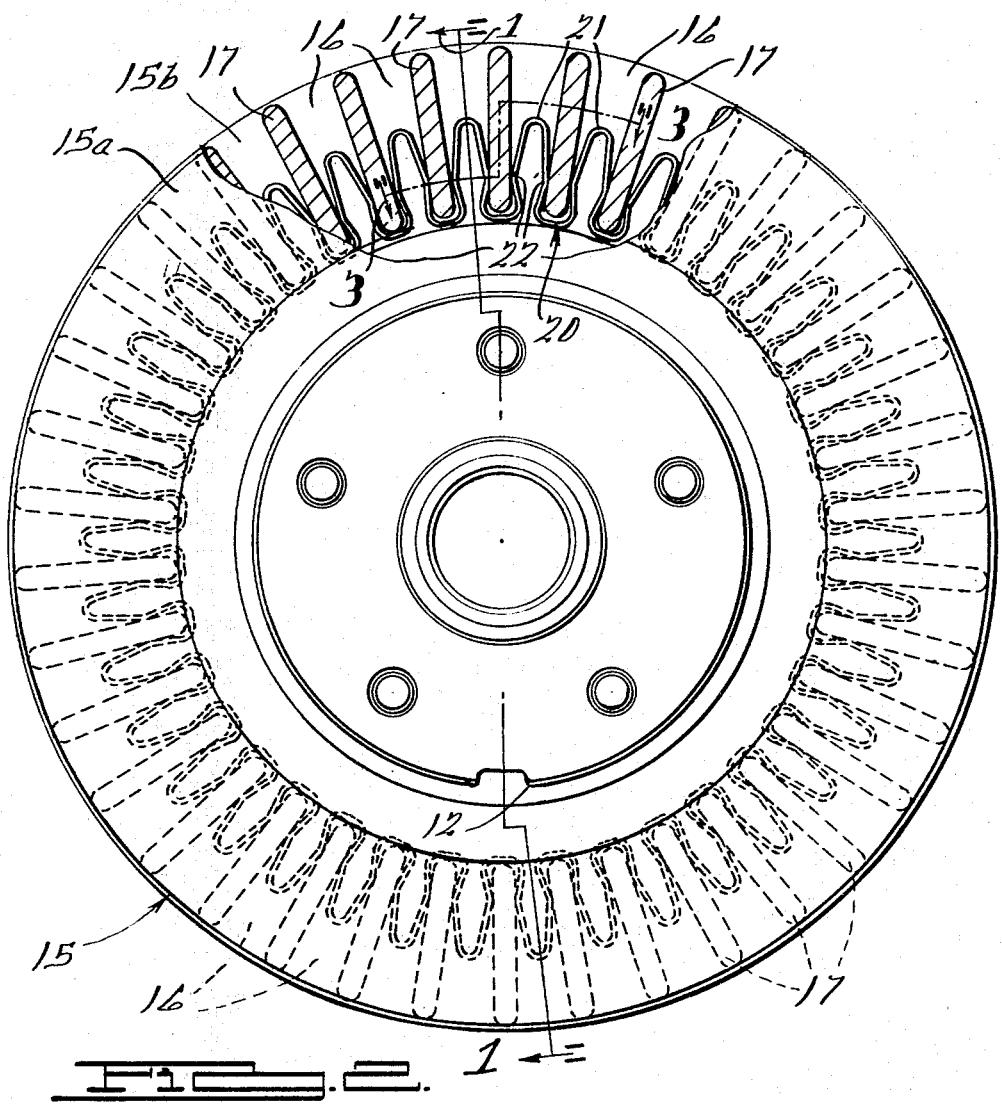
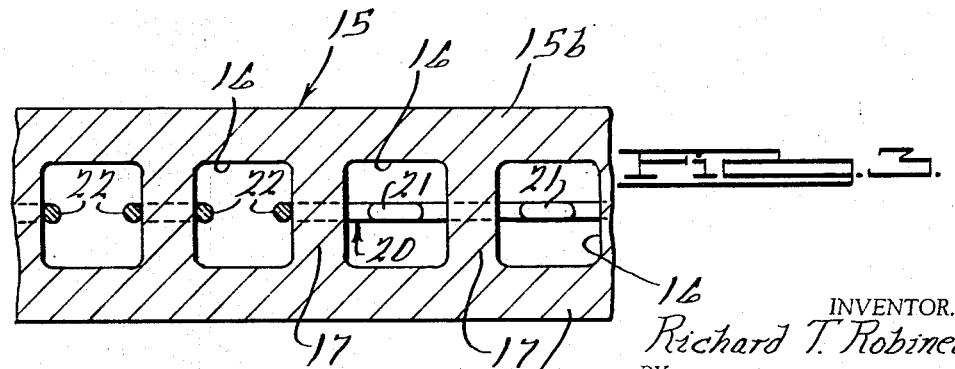
INVENTOR.
Richard T. Robinette
BY
Harness, Dickey & Pierce
ATTORNEYS

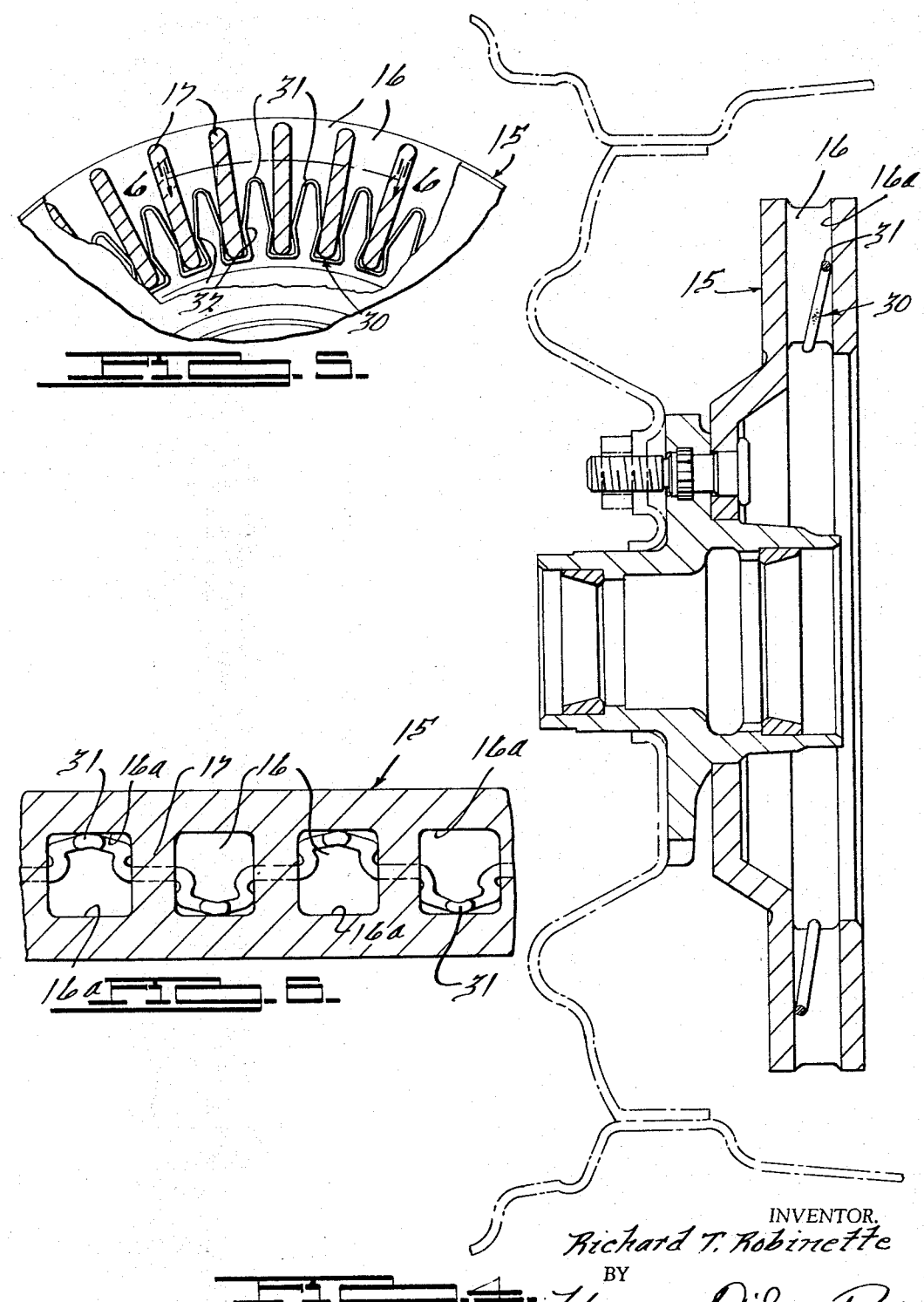

United States Patent Office 3,292,746
Patented Dec. 20, 1966

3,292,746
VIBRATION DAMPENER FOR DISK BRAKES
Richard T. Robinette, St. Clair Shores, Mich., assignor to Kelsey-Hayes Company, Romulus, Mich., a corporation of Delaware
Filed Nov. 5, 1965, Ser. No. 506,518
5 Claims. (Cl. 188—218)

This invention relates to disk brakes and, more particularly, to vibration dampeners therefor.

In the automotive industry, considerable difficulty has been experienced in dampening the audible vibrations set up in the brake disk through the frictional engagement of the brake shoes with the brake disk. These audible vibrations occur at certain periods of vibration of the brake disk and produce a noise which is annoying and objectionable. The present invention is designed to overcome these objections.

An object of the invention is to provide means for dampening the vibrations of a disk brake.

Another object of the invention is to provide means for minimizing or preventing vibrations in a disk brake consisting of the provision of a wire dampening member interposed between the spaced walls of the brake disk and engaging the webs extending between said spaced walls.

Another object of this invention is to provide a device of this type which is so reduced in the number and character of its component parts as to approach the ultimate in structural simplicity to thereby create an economy in its manufacture, installation and maintenance costs.

The various objects and advantages, and the novel details of construction of one commercially practical embodiment of the invention, will become more apparent as this description proceeds, especially when considered in connection with the accompanying drawings, in which:

FIGURE 1 is a vertical sectional view through a brake disk embodying this invention, taken substantially on the plane indicated by line 1—1 in FIGURE 2, the wheel and rim being shown in dotted lines;

FIGURE 2 in an elevational view, partly in section, of the brake disk shown in FIGURE 1;

FIGURE 3 is an enlarged fragmentary sectional view taken substantially on the plane indicated by line 3—3 in FIGURE 2;

FIGURE 4 is a view similar to FIGURE 1 showing a modified dampening member;

FIGURE 5 is a fragmentary view similar to FIGURE 2, showing this modification; and FIGURE 6 is an enlarged fragmentary sectional view taken substantially on the plane indicated by line 6—6 in FIGURE 5.

The brake of this invention is shown as being associated with a vehicle wheel having a rim 10 and a wheel body 11 secured to the axle flange 12 by means of studs or bolt and nut assemblies 13.

Also secured to the flange 12, as for instance by means of the same studs or bolt and nut assemblies 13, is a brake disk 15. In the form of the invention illustrated, the brake disk 15 is formed of a pair of spaced walls 15a and 15b with which the brake shoes (not shown) engage. The brake disk is provided with a plurality of radially extending apertures 16 formed by radially extending webs or walls 17 extending between and connected to the spaced walls 15a and 15b. The webs 17 function as fan blades and serve to move cooling air in a radially outward direction between the walls 15a and 15b when the brake is rotated. It will be noted from FIGURE 1 that the apertures 16 are open at their radially inner and outer ends.

As stated, an object of this invention is to provide means for dampening the vibrations in the disk brake which are set up by the frictional engagement of the brake shoes with the braking surfaces of the disk brake. For this purpose, there is provided a spring wire member 20 bent into circular shape and provided with a plurality of lobes or loops 21 which are pressed into the openings 16 between the radially extending webs or walls 17. Each loop 21 is provided with opposed outwardly bowed portions 22 which frictionally engage the radially extending walls 17 and assist in holding the spring member 20 in place. The loops 21 at their outwardly bowed portions 22 are slightly larger than the space between the webs or walls 17, so that these loops will frictionally engage the adjacent webs 17 to provide a press fit between these parts. Thus, the lobes or loops 21 of the member 20 perform the desired function of dampening the vibrations set up in the brake disks.

The spring wire member 20 may be made in a straight length and then bent into circular shape with the ends thereof permanently connected. It will be noted that the passageways or apertures 16 extend radially outwardly between adjacent webs or walls 17 so that the wire member may be conveniently inserted into the spaces 16 from the radially inner ends thereof.

In the modification illustrated in FIGURES 4, 5 and 6, there is shown a spring wire member 30 bent into circular shape and provided with a plurality of lobes or loops 31 which are pressed into the openings 16 between the radially extending webs or walls 17 of the brake disk 15. Each loop 31 is provided with opposed bowed portions 32, as in the first described construction, which frictionally engage the radially extending walls 17 and assist in holding the spring member 30 in place. As in the previously described construction, the loops 31 at their outwardly bowed portions 32 are slightly larger than the space between the webs or walls 17 so that these loops will frictionally engage the adjacent webs 17 to provide a press fit between these parts. However, in this form of construction, the loops 31 are alternately bent in opposite directions against the outside walls 16a of the openings 16, as best shown in FIGURES 4 and 6.

With the foregoing construction, the outwardly bowed portions 32 frictionally engage the radially extending walls 17 and the outer ends of the loops 31 alternately frictionally engage the outer walls 16a of the openings 16. Thus, in this form of construction, each loop 31 frictionally engages the brake disk 15 at a plurality of points and the loops are alternately oppositely inclined so as to balance the construction.

From the foregoing, it will be seen that there is provided a simple device for dampening the vibrations in the brake disk which is inexpensive to manufacture, easy to install and which requires little, if any, maintenance costs.

While two commercially practical embodiments of the invention have been described and illustrated herein somewhat in detail, it will be understood that various changes may be made as may come within the purview of the accompanying claims.

What is claimed is:

1. A brake comprising a brake disk having a pair of axially spaced walls connected by circumferentially spaced, radially extending walls, and a circular vibration dampening member having loop portions extending into the space between said radial walls in frictional engagement therewith.

2. A brake comprising a brake disk formed of a pair of axially spaced walls connected by circumferentially spaced, radially extending walls forming a plurality of radially extending apertures, and a circular vibration dampening member formed of wire and having loop portions extending into said apertures in frictional engagement with said radially extending walls.

3. A brake comprising a brake disk formed of a pair of axially spaced walls connected by circumferentially spaced, radially extending walls forming a plurality of radially extending apertures, and a circular vibration dampening member formed of spring wire and having lobe portions extending into said apertures from the radially inner ends thereof in frictional engagement with said radially extending walls.

4. A brake comprising a brake disk formed of a pair of axially spaced walls connected by circumferentially spaced, radially extending walls forming a plurality of radially extending apertures, and a circular vibration dampening member formed of spring wire and having circumferentially spaced loop portions extending into said apertures, each loop portion having outwardly bowed sides for frictional engagement with said radially extending walls.

5. A brake comprising a brake disk formed of a pair of axially spaced walls connected by circumferentially spaced, radially extending walls forming a plurality of radially extending apertures, and a circular vibration dampening member formed of spring wire and having circumferentially spaced loop portions extending into said apertures, each loop portion having outwardly bowed sides for frictional engagement with said radially extending walls, said loops being alternately oppositely inclined so as to engage the adjacent outer wall of the brake disk.

References Cited by the Examiner
UNITED STATES PATENTS 2,764,260   9/1956   Fleischman _____ 188—1

BENJAMIN HERSH, *Primary Examiner.*

B. S. MOWRY, *Assistant Examiner.*